United States Patent
Ehrlich

[11] 3,804,436
[45] Apr. 16, 1974

[54] TIE RAIL
[75] Inventor: Donald J. Ehrlich, Monon, Ind.
[73] Assignee: Monon Trailer Inc., Monon, Ind.
[22] Filed: July 13, 1972
[21] Appl. No.: 271,300

Related U.S. Application Data
[63] Continuation of Ser. No. 74,711, Sept. 23, 1970, abandoned.

[52] U.S. Cl. ......................... 280/179 A, 105/369 A
[51] Int. Cl. ............................................. B60p 7/00
[58] Field of Search .................. 280/179 A, 179 R; 105/369 A

[56] References Cited
UNITED STATES PATENTS
2,532,743  12/1950  Storch .......................... 105/369 A
2,939,406  7/1960   Wilkoff .......................... 105/369 A
2,059,390  11/1936  Pagel ............................ 105/369 A
807,170   12/1905  Holtzhouser .................... 105/369 A

*Primary Examiner*—Robert R. Song
*Attorney, Agent, or Firm*—Olson, Trexler, Wolters, Bushnell & Foose, Ltd.

[57] ABSTRACT

A tie rail for tying down objects such as cargo within a container such as a trailer is disclosed herein and includes an elongated base which is mountable to an inside wall of said container and which includes a plurality of openings. A connector, provided with each opening, for securing objects to the base of said rail is positioned entirely within an associated opening and mounted within recesses provided in a portion of said base which defines the opening.

5 Claims, 4 Drawing Figures

PATENTED APR 16 1974 3,804,436
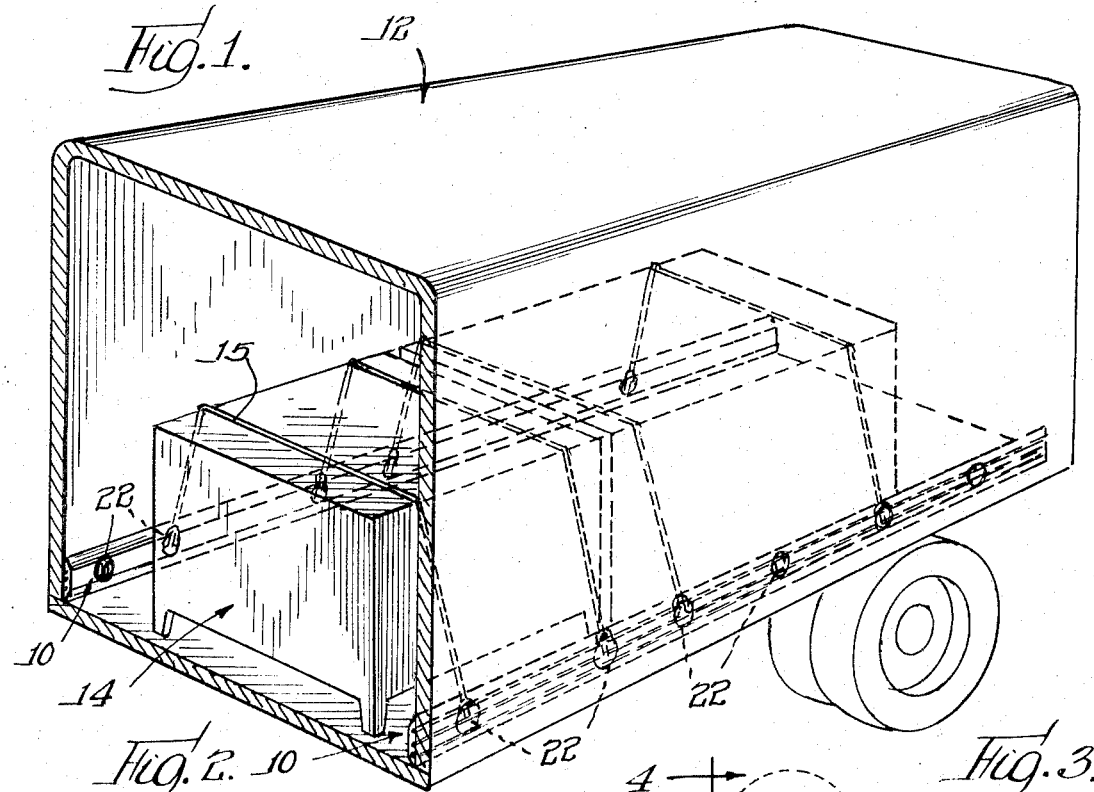
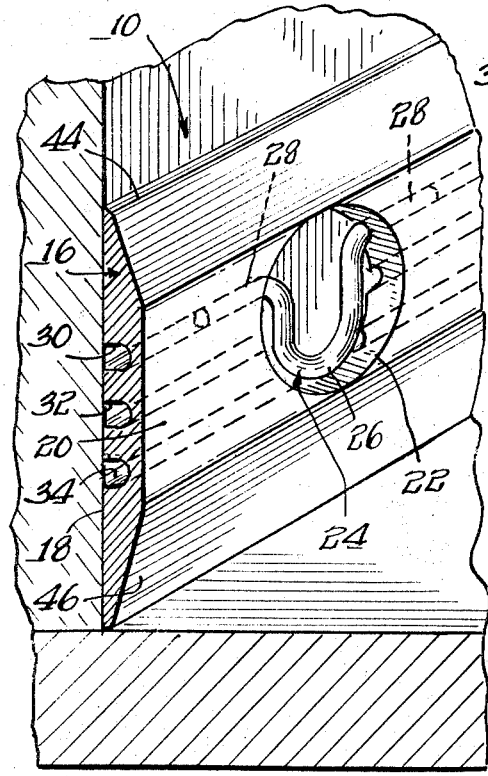
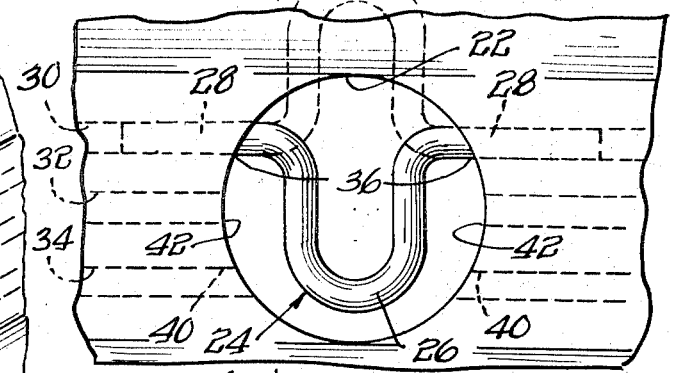
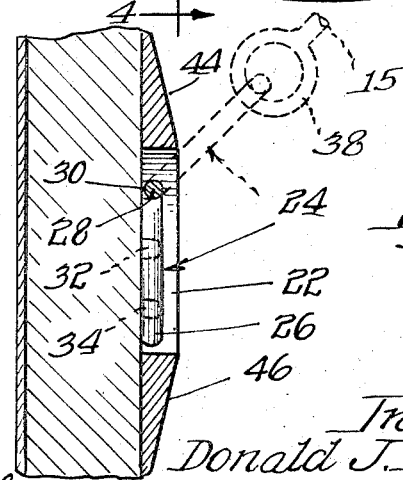
Inventor
Donald J. Ehrlich
By Olson, Trexler, Wolters & Bushnell attys

TIE RAIL

This is a continuation of application Ser. No. 74,711, filed Sept. 23, 1970, now abandoned.

SRMMARY OF THE INVENTION

This invention relates generally to fastening devices and more particularly to tie rails for tying down cargo within a trailer or the like.

DISTINCTIONS OVER THE PRIOR ART AND OBJECTS

Today, most cargo which is placed within a trailer or other type of transporting vehicle is tied down by utilizing eye-bolts or other similar types of fastening devices which are mounted to and extend outwardly from the sides of the trailer, ropes being provided for tying the cargo to the eye-bolts. This method has two distinct disadvantages. Firstly, it requires drilling or otherwise providing recesses in the trailer's sides for receiving the eye-bolts. Since these bolts are generally quite large, large recesses are required which, in turn, can cause damage to the trailer's body. Secondly, these protruding or outwardly extending bolts frequently catch against and cause damage to the cargo, which is quite often exposed or uncrated furniture, when the latter is introduced into and removed from the trailer.

Accordingly, a general object of the present invention is to provide a new and improved tie rail for tying down cargo within a trailer and which does substantially no damage to either the cargo or the trailer.

A more particular object of the present invention is to provide a tie rail of the above described type which eliminates the necessity of mounting eye-bolts or other similar fastening devices directly into the body of the trailer.

Still another object of the present invention is to provide a tie rail of the above described type which presents a substantially smooth or flush surface to the cargo when the latter is introduced into or removed from the trailer for eliminating damage to the cargo, which is otherwise prevalent with the utilization of outwardly extending fastening devices such as eye-bolts.

These and other objects and features of the present invention will become more apparent from a reading of the following descriptions.

BRIEF DESCRIPTION OF THE DRAWING

In the Drawing:

FIG. 1 is a perspective view of a trailer body carrying cargo which is tied down by a pair of tie rails constructed in accordance with the present invention;

FIG. 2 is an enlarged partially broken away perspective view of a portion of one of the tie rails used with the trailer body of FIG. 1;

FIG. 3 is a partially broken away front view of the tie rail of FIG. 2; and

FIG. 4 is a vertical sectional view, taken generally along line 4—4 of FIG. 3.

DETAILED DESCRIPTION

Turning to the drawing, wherein like components are designated by like reference numerals throughout the various figures, a pair of tie rails 10 constructed in accordance with the present invention are mounted to the inside walls of a trailer body 12 and connected to various ropes 15 for tying down cargo such as furniture 14 located within the trailer, as illustrated in FIG. 1. As will be seen hereinafter, the tie rails present substantially smooth or flush surfaces to the interior of the trailer body. In this manner, the furniture may be placed within and removed from the trailer without being scratched or otherwise damaged by the tie rails. In addition, the tie rails act as scuff or protective rails for the interior of the trailer.

Turning to FIGS. 2 to 4, each of the tie rails 10 includes an elongated substantially rectangular base 16 having a flat back side 18 which is mountable to an inside wall of trailer body 12 by screws, rivets, a suitable bonding agent, or other similar fastening means (not shown) and a front exposed side 20. The base, while not being limited to any particular material, is preferably constructed of extruded aluminum. However, the invention also contemplates the specific utilization of extruded plastic or similar synthetic resin.

The front side 20 of base 16 includes a plurality of longitudinally spaced circular openings 22 extending transversely through the base and back side thereof, only one such opening being shown in FIGS. 2 and 3. A fastening element or connector 24 provided with each opening 22 is mounted to base 12 in a manner to be described hereinafter and is positioned entirely within the opening so that the front side 16 of the base remains substantially smooth, as stated above. In this manner, the fastening elements 24 cannot scratch or otherwise damage the furniture 14 when the latter is introduced into and removed from trailer 12, this type of damage being quite prevalent with the utilization of projecting or outwardly extending fastening devices. In addition, the tie rail acts as a scuff or protective rail for the trailer's interior.

Directing attention to FIG. 3, each of the fastening elements or connectors 24 preferably is constructed from a cylindrical rod, preferably steel, which is suitably shaped so as to include a substantially U-shaped body or connecting portion 26 for securing one end of the rope 15 to base 16, and a pair of mounting arms 28 extending outwardly from and formed with the otherwise free ends of U-shaped body portion 26 for mounting the fastening element to base 16.

As illustrated in FIG. 2, three vertically spaced and inwardly extending grooves or channels 30, 32 and 34 are provided in the back side 18 of base 12 and extend longitudinally along the entire length of the base. As seen in FIG. 3, the channel or groove 30 extends across the opening 22, near the top thereof, and cooperates with the inside wall of trailer 12 for providing a pair of longitudinally aligned closed recesses 36 which are sufficiently dimensioned for snugly but pivotally receiving the mounting arms 28 of connector 24.

The connector is mounted to base 16 by inserting the mounting arms 28 into respective aligned recesses 36 formed in the back side 18 prior to the mounting of the base to the inside wall of the trailer and thereafter mounting the base thereto. Because of the pivotal connection between these recesses and mounting arms, the connector swings or pivots downward through the weight of the U-shaped body portion 26 and against the side of trailer 12 entirely within the opening 22 so that it does not interfere with the introduction and removal of cargo 14, this being illustrated best in FIG. 4. In this regard, it is to be noted that the over-all length of the U-shaped body portion 26 is slightly less than the cross-sectional diameter of opening 22 and therefore extends to a point slightly above the bottom of the opening. The connector is pivoted or swung outwardly, as illustrated by dotted lines in FIGS. 3 through 4, for engaging one end of a rope 15 thereto. As seen in FIG. 4, a typical snap-ring 38, or other suitable means, connected to the end of the rope may be provided for this purpose.

Referring again to FIGS. 2 and 3, the lower groove or channel 34, which is substantially the same distance away from the bottom of the opening as the groove or channel 30 is away from the top thereof, cooperates with the side of trailer 12 for providing a pair of aligned closed recesses 40 which are the same size as recesses 36. In this manner, the same tie rail 10 may be provided on either side of the trailer without the necessity of requiring a specific left-hand tie rail or a specific right-hand tie rail. For example, as illustrated in FIG. 1, the right-hand tie rail 10, as viewed from the front of trailer body 12, is identical to the left-hand tie rail 10, the former merely being inverted so that the recesses 40 appear at the top of the openings 22 with the mounting arms 28 of connector 24 being inserted therein, in the same manner as described above.

It should be noted that channel or groove 32 is positioned intermediate grooves 30 and 34 and cooperates with openings 22 in the same manner as the previously described grooves for providing intermediate aligned recesses 42.

Directing attention to FIG. 2, it is to be noted further that front side surface 20 includes upper and lower inwardly inclined surfaces 44 and 46, respectively, extending the entire length of the base 16. In the event the tie rails are positioned vertically, these inclined surfaces provide cam surfaces for catching the cargo as it is introduced and removed from the trailer body.

It is to be understood that the invention herein disclosed and claimed contemplates the utilization of various sized and shaped openings 22, various sized and shaped connectors 24, and any number of grooves or channels similar to those illustrated, so long as the connectors are received entirely within the openings. In addition, the tie rail 10 may be provided with any suitable container and positioned in any manner which is most advantageous for tying down or securing objects held therein. For example, the tie rails 10 may be positioned horizontally as illustrated in FIG. 1, vertically, or they may be mounted to the top of the trailer body. In addition, if required, more than one connector or fastening element 24 may be provided with each opening 22.

While a particular embodiment of the invention has been shown, it should be understood, of course, that the invention is not limited thereto since many modifications may be made. It is, therefore, contemplated to cover by the present invention any such modifications as fall within the true spirit and scope of the appended claims.

The invention is claimed as follows:

1. A device for tying down objects such as cargo within a container such as a trailer, said device comprising an elongated tying rail having one side surface mountable to an inside wall of said container, an opposite exposed side surface and a plurality of longitudinally spaced openings extending through said tying rail and side surfaces, elongated channel means in said one side surface and extending longitudinally the entire length of said rail and intersecting each of said openings at the peripheral edge thereof and having aligned portions extending oppositely from said openings, and connectors having generally U-shaped portions respectively disposed within the confines of the peripheral edge of each of said openings, each of said connectors including oppositely extending free end elements projecting from within an associated opening into and pivotally retained in oppositely extending aligned channel portions adjacent each of the openings.

2. A device, as defined in claim 1, wherein said channel means includes a plurality of separate generally parallel channels intersecting openings and having portions extending oppositely from the openings into which end elements of said connectors may be selectively positioned prior to laying the tie rail against the interior wall of the container.

3. A device, as defined in claim 1, wherein the tying rail extends longitudinally of the container for reception of the connector end elements also extending longitudinally.

4. A device, as defined in claim 3, wherein the elongated channel means and the connector end elements are of substantially the same cross section for a snug fit therebetween.

5. A device, as claimed in claim 4, wherein the openings are of a size to receive the U-shaped portions of the connectors within the confines thereof when the end elements of the connectors are mounted in channels above or below the central portion of the openings.

* * * * *